Figure 1:
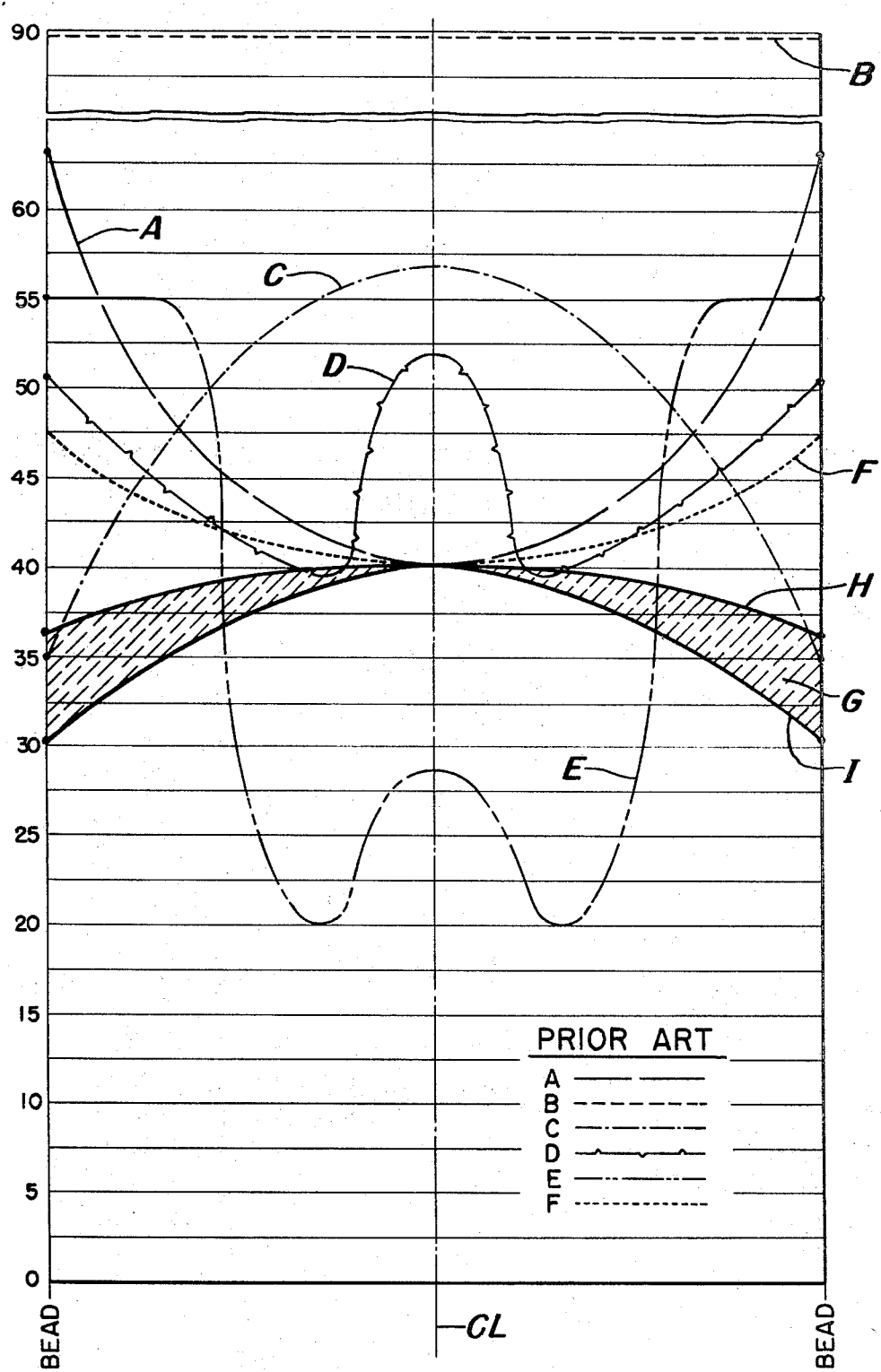

United States Patent [19]
Abbott

[11] 3,770,041
[45] Nov. 6, 1973

[54] CORD REINFORCED PNEUMATIC TIRE HAVING A SPECIAL CORD ANGLE RELATIONSHIP

[75] Inventor: John R. Abbott, Cuyahoga Falls, Ohio

[73] Assignee: The Goodyear Tire and Rubber Company, Akron, Ohio

[22] Filed: Feb. 28, 1972

[21] Appl. No.: 229,923

[52] U.S. Cl. ............................... 152/356, 152/354
[51] Int. Cl. ............................................ B60c 9/06
[58] Field of Search .................... 152/354, 356, 359

[56] References Cited
FOREIGN PATENTS OR APPLICATIONS
594,401  3/1960  Canada............................ 152/356

Primary Examiner—Gerald M. Forlenza
Assistant Examiner—Robert Saifer
Attorney—F. W. Brunner et al.

[57] ABSTRACT

A pneumatic tire having a carcass of bias ply cord reinforced fabric characterized by the cord path of the fabric being defined by the equation $\rho \cos^\lambda \alpha = K$. Tires are disclosed having a special cord path, as well as specified reinforcing layers beneath the tread and additional plies extending about the beads.

The foregoing abstract is not to be taken as limiting the invention of this application, and in order to understand the full nature and extent of the technical disclosure of this application, reference must be made to the accompanying drawings and the following detailed description.

20 Claims, 5 Drawing Figures

CORD REINFORCED PNEUMATIC TIRE HAVING A SPECIAL CORD ANGLE RELATIONSHIP

This invention relates to pneumatic tires and more particularly to pneumatic tires having a special cord path in the carcass plies.

There are basically three different kinds of pneumatic tires available to the public at the present time. They include the radial ply tire which contains one or more carcass plies in which the cords extend from bead to bead and lie substantially in a plane containing the rotational axis of the tire. Radial ply tires further include a belt structure extending circumferentially about the tire and disposed beneath the tread portion for restricting and rigidifying the tread portion.

The second type of tire is the conventional bias ply tire having cords extending from bead to bead and disposed at an acute angle with respect to a plane perpendicular to the rotational axis of the tire. The carcass plies in these tires have a specific cord path which is provided by utilizing uncured tire fabric, which when flat is made of bias laid straight cords. The finished cord path is well known and is formed during the shaping of the tire.

The third type of tire is a bias belted tire which includes the normal carcass of a bias ply tire but further includes a belt structure disposed beneath the tread portion and surrounding the carcass plies to restrict and rigidify the tread portion of the tire.

By the present invention an entirely new type of tire is proposed whereby the cords in the carcass plies extend from bead to bead along a specified path. This special cord path relationship in the carcass of a tire of the present invention greatly reduces the shear stresses due to inflation pressure between the various plies in the carcass as compared to bias ply tires. Further, by utilizing this special cord angle relationship the torque transmission capability of the tire is increased while the propensity for sidewall buckling under torque load is reduced. This tire will also exhibit improved handling, low rolling resistance, and less heat build-up in the sidewalls.

It is, therefore, an object of the present invention to provide a pneumatic tire having a special cord path relationship in the carcass plies.

It is a further object of this invention to provide a pneumatic tire having low internal stresses due to inflation pressure, low rolling resistance and fuel consumption and at the same time exhibit improved durability, resistance to sidewall buckling, handling and torque transmitting capabilities.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 3:
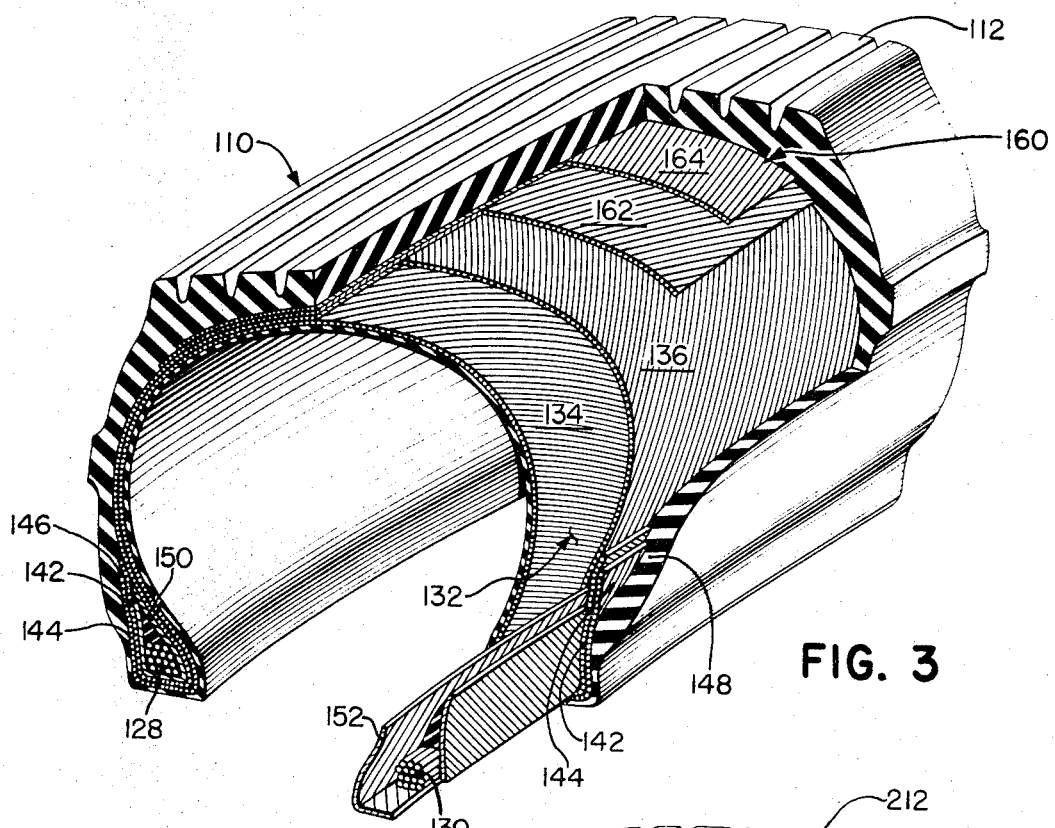
Figure 4:
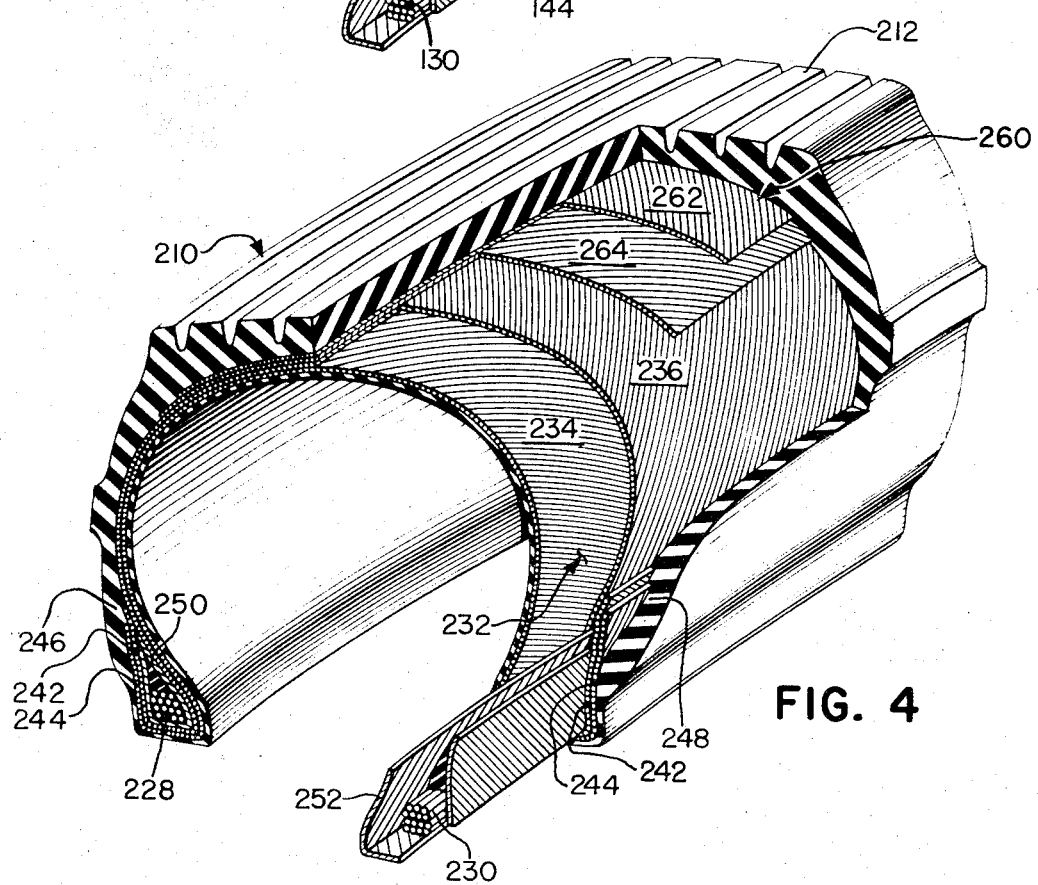
Figure 5:
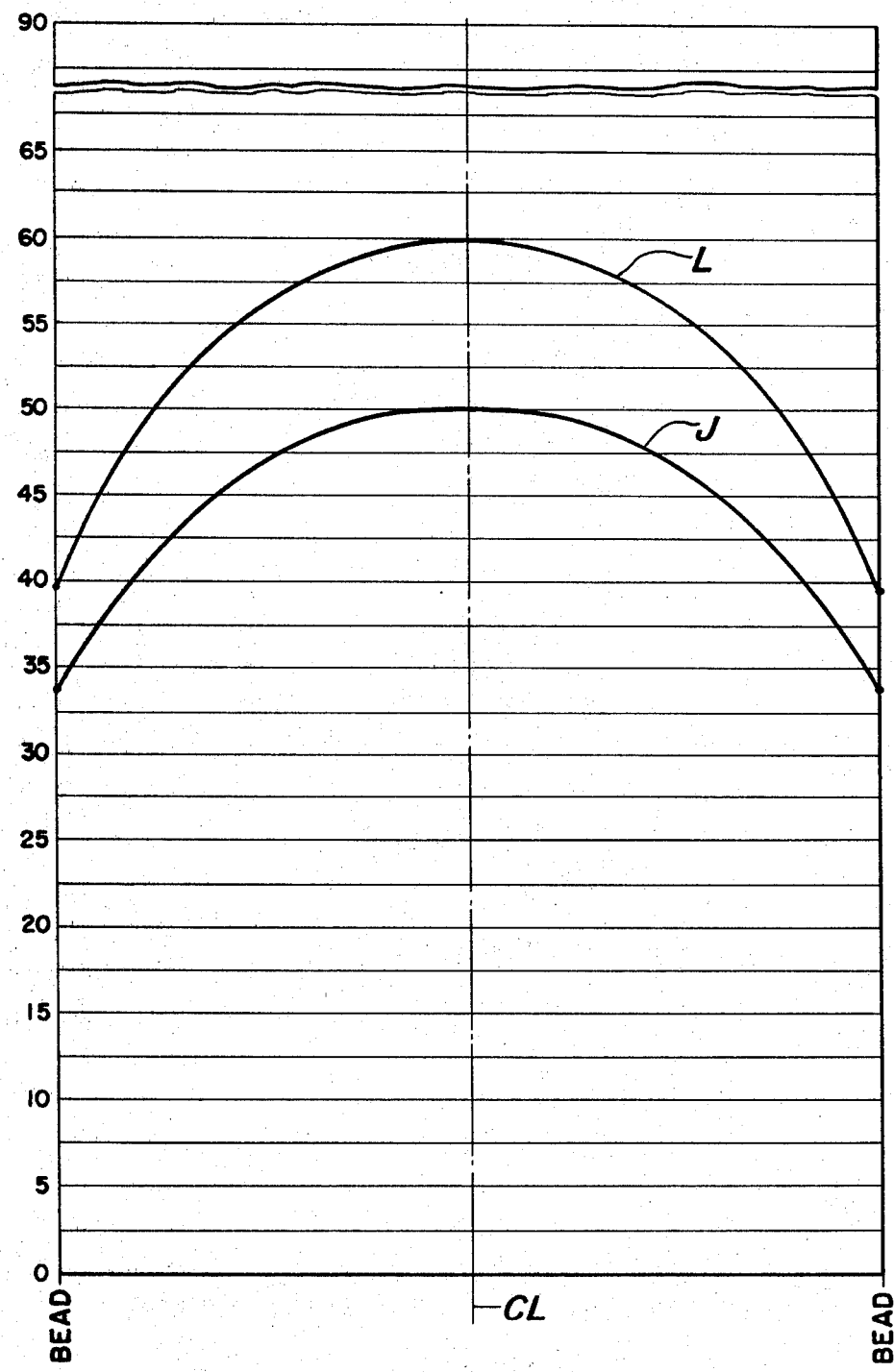

In the drawings:

FIG. 1 is a graphical illustration of the cord angle distribution in the carcass plies of a tire constructed in accordance with this invention as the cord progresses from one bead across the crown of the tire into the other bead. Some examples of prior art cord angle arrangements are also provided on this graph for comparative purposes, FIG. 2 is a perspective view of a portion of a tire constructed in accordance with this invention with portions broken away, FIG. 3 is a perspective view of a portion of a tire constructed in accordance with an alternate embodiment of this invention with portions broken away, FIG. 4 is a perspective view of a portion of a tire constructed in accordance with an additional alternate embodiment of this invention with portions broken away, and FIG. 5 is a graphical illustration of the tire cord angles of two different tires constructed in accordance with this invention and utilizing crown cord angles of 50° and 60°, respectively.

Figure 2:
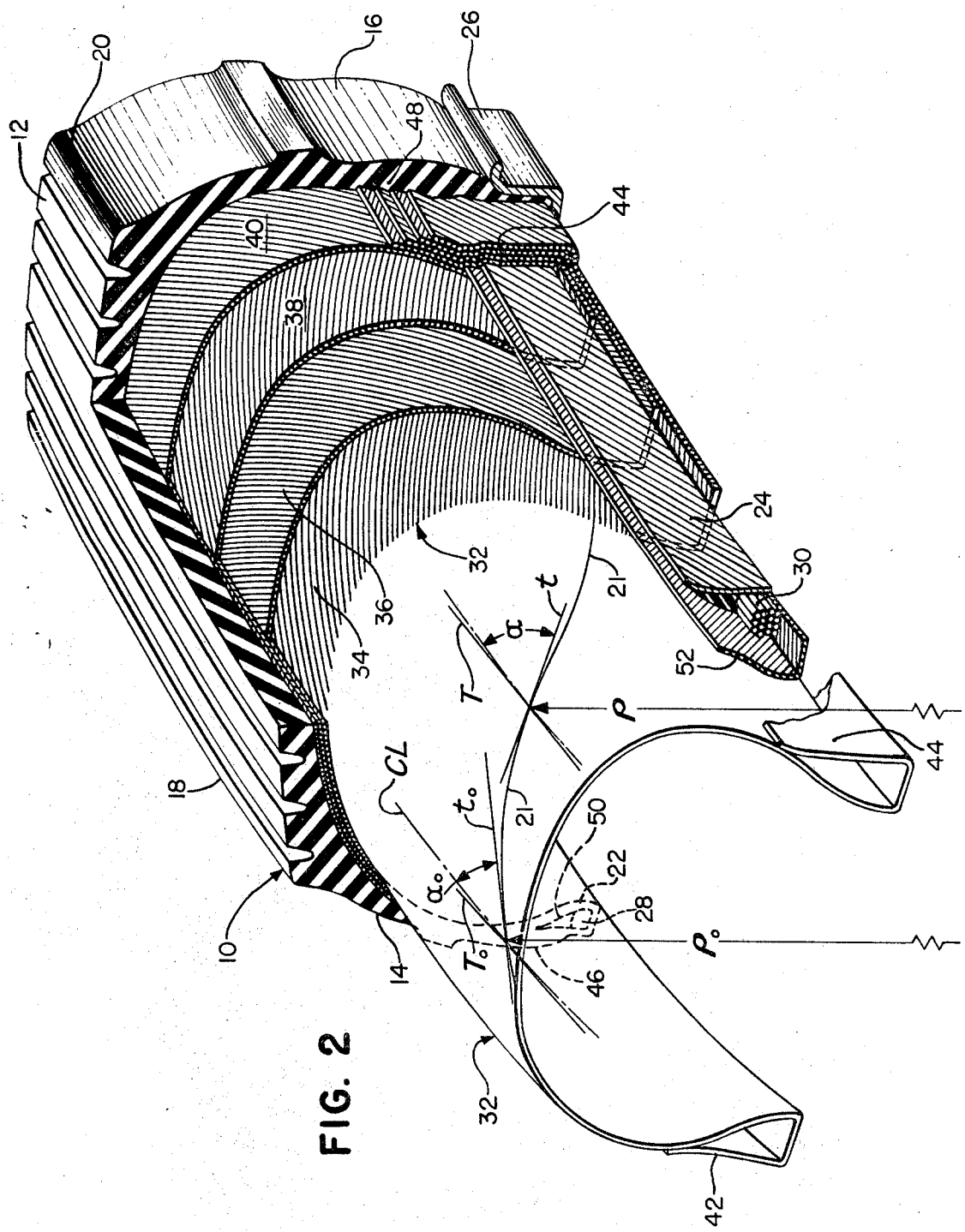

With reference to the drawings and in particular FIG. 2 there is illustrated a tire constructed in accordance with the present invention. The tire 10 includes a tread or ground contacting portion 12 extending circumferentially thereabout. A pair of sidewall portions 14, 16 extend radially inwardly from the lateral edges of the tread 12 or shoulder 18, 20 and terminate at their radially inner ends in bead portions 22, 24. For purposes of this invention the sidewall portion 16 will be considered that portion of the tire which is located radially outwardly of the flange 26 of the wheel on which the tire is mounted and radially inwardly of the shoulder regions 18, 20. Each bead portion 22, 24 is provided with an annular inextensible bead core 28, 30. The tire 10 further includes a carcass 32 comprising plies 34, 36, 38 and 40 of parallel cord tire fabric extending circumferentially about the tire and having their inner ends turned up and about the respective bead cores 28, 30. For purposes of this invention, the carcass shall mean collectively those reinforcing plies which extend circumferentially about the tire and from bead to bead.

Each successive carcass ply 34, 36, 38 and 40 has its cords extending at opposite bias angles with respect to the mid-circumferential centerline CL of the tire 10. For purposes of this invention the mid-circumferential centerline CL shall be a line which extends circumferentially about the tire, passes through the cords in question midway between the lateral edges 18, 20 of the tread portion 12 and lies in a plane perpendicular to the rotational axis of the tire. The "crown cord angle" (alpha$_o$) $\alpha_o$ of a ply or a cord 21 in a ply shall be the angle $\alpha_o$ which a tangent $t_o$ to the cord at the centerline CL makes with a tangent $T_o$ to the mid-circumferential centerline CL at the mid-circumferential centerline. The radius ($rho_o$) $\rho_o$ is a radius from the rotational axis of the tire to the point of intersection of the cord in question and the centerline CL. Further, the "cord angle" $\alpha$ of a ply or cord 21 in a ply shall be the acute angle between a line $t$ tangent to the cord at the point in question and a tangent $T$ to a circle which; passes through the point in question; is perpendicular to the rotational axis of the tire; has its center coincident with the rotational axis of the tire; and has a radius $\rho$ equal to the distance from the rotational axis of the tire to the point in question. It can be seen, therefore, that $\alpha_o$ is a specific position and value of a general term $\alpha$; that is $\alpha_o$ denotes the angle $\alpha$ at the mid-circumferential centerline of the tire.

With these definitions of the cord angle $\alpha$ and the radius $\rho$ in mind, we will now look to some prior art and the present invention. With reference to FIG. 1 the curve A represents a typical conventional bias ply pneumatic tire in which the cord angle is fairly low at the mid-circumferential centerline or crown of the tire and increases as it progresses to the respective bead portions. A tire of this character is constructed by utilizing bias laid straight cords in the unvulcanized tire cord fabric. This tire cord fabric is wrapped circumferentially about a cylindrical building drum. The cord path A is formed during the shaping operation in which the cylindrical unvulcanized tire is shaped to the toroidal form.

A second cord path B is utilized in the well known radial ply tires and includes carcass plies having a cord angle of substantially 90°.

A third proposal which has been known in the past and was proposed in U.S. Pat. No. 2,700,998 is the geodesic cord path C. This cord path is also well known and characterized by the cord path being the shortest distance between a point on one bead to a point on the other bead. The geodesic cord path is defined by the equation $\rho \cos \alpha = $ a constant, where the constant equals $\rho_o \cos \alpha_o$ (see *Mathematics Underlining the Design of Pneumatic Tires* by John F Purdy, published by the Hiney Publishing Company of Akron, Ohio, in 1963). Still another cord path proposed in U.S. Pat. No. 2,700,998 and represented by curve D in FIG. 1 of the present application utilizes a so-called "dual angle" cord path.

Yet another special cord path relationship has been proposed in U.S. Pat. No. 3,628,586 for use in conjunction with high-speed tires. This cord path is represented by curve E of FIG. 1 of the present application and has for one of its specific objects the provision of a flat tread profile throughout a wide range of speeds.

One additional proposal of a special cord path is a cotangent cord path represented by curve F of FIG. 1 which is defined by the equation $\cot^\lambda \alpha/\rho = $ a constant. This special cord path was proposed by John F Purdy in his book *Mathematics Underlining the Design of Pneumatic Tires* et seq.

In accordance with the present invention a special cord path relationship in the carcass represented by the shaded area G in FIG. 1 is provided whereby the cord angle of each cord in a given ply follows a path defined by the equation $\rho \cos^\lambda \alpha = $ a constant $K$, where $\rho$ and $\alpha$ are as defined above in conjunction with FIG. 2, $\lambda$ is any positive real number between 1.2 and 10.0, and the constant $K = \rho_o \cos^\lambda \alpha_o$. The curve H represents a tire having a crown cord angle of 40° and a $\lambda$ value of 10. The curve I represents a tire having a crown cord angle of 40° and a $\lambda$ value of 4.3. The shaded area G represents the successive variations available between a $\lambda$ value of 4.3 and 10.0. It should be noted that with a crown cord angle of 40° the practical lower limit of the value of $\lambda$ is 4.3. As will be seen later a tire utilizing a crown cord angle of 60° will be able to accommodate a $\lambda$ value as low as 1.2.

In designing and constructing a tire in accordance with this invention the radius $\rho_o$ and crown cord angle $\alpha_o$ are dependent on the size, shape and other characteristics of the desired tire and are determined by the tire engineer. The value of $\lambda$ again is determined by the engineer and depends upon the desired tire characteristics such as the rim width and the bead seat diameter. Once having determined $\alpha_o$, $\rho_o$ and $\lambda$, the value of the constant $K$ can be determined utilizing the formula $\rho_o \cos^\lambda \alpha_o = K$. The equation $\rho \cos^\lambda \alpha = K$. then defines the cord path of the carcass plies in the tire. From this cord path relationship the path of the cords in the flat unvulcanized ply is determined utilizing the well known cosine low of pantographing wherein $\gamma \cos \alpha = \rho \cos B$ when $\alpha$ and $\rho$ are as defined above and $\gamma$ is the radius of the tire building drum and B is the cord angle at the point in question on the flat tire building fabric.

The unvulcanized plies of tire cord fabric are provided having the specified cord path and wrapped about a tire building drum in the normal manner. The tire is then shaped to a toroidal form causing the cords in the carcass to assume the desired cord path.

Considering the tire 10 of FIG. 2 in more detail, the cord path configuration provides a very low shear stress in the upper sidewall and tread portion of the tire. This is particularly advantageous since it provides less heat buildup in the critical areas of the shoulders or lateral edges 18 and 20 of the tire 10. Further, the low cord angle in the sidewall, and particularly the lower sidewall area near the beads provides the advantage of increased torque transmitting capabilities, as well as resistance to sidewall buckling under torque loads.

Since the cord angle is low in the lower sidewall region it is desirable to turn the ends 42 and 44 of the carcass plies 32 up about the bead core 28 and 30 and into the lower sidewall region 46 and 48, respectively, to provide additional support in this area. It may further be desirable to provide additional reinforcing plies 50, 52 in the lower sidewall region which extend about the respective bead cores 28 and 30 and into respective lower sidewall regions 46, 48. These reinforcing plies 50 and 52 advantageously have a higher cord angle than the carcass plies in the region immediately adjacent thereto. Preferably the cord angle is between about 40° and 60°.

In accordance with an alternate embodiment of the present invention illustrated in FIG. 3 a tire 110 includes a carcass 132 having a pair of plies 134, 136 with their radially inner ends 142, 144 extending about the respective bead cores 128, 130 and into the respective lower sidewall region 146, 148. The cord path of the plies 134, 136 again is defined by the equation $\rho \cos^\lambda \alpha = K$. Additional reinforcing plies 150, 152 which extend about the respective bead cores 128, 130 and into the lower sidewall regions 146, 148 may also be provided.

In order to provide a more rigid tread region, and if desired a lower tire profile, a belt structure 160, including two or more plies 162, 164 of parallel cord tire fabric may be provided circumferentially about the carcass 132, and substantially coextensive with the tread region. Successive carcass and belt plies 134, 136, 162, 164 have have alternate bias angles $\alpha_o$ with respect to the mid-circumferential centerline. The belt structure circumferentially restricts the tire and such restriction may advantageously be provided by disposing the cords in the belt structure 160 at an angle at the mid-circumferential centerline which is less than the crown cord angle $\alpha_o$ of the carcass plies.

With reference to FIG. 4 a still further embodiment of the invention, a tire 210 contains two or more carcass plies 234 and 236 of tire cord fabric having a cord path defined by the equation $\rho \cos^\lambda \alpha = K$ as described above. The tire may again include a reinforcing ply 250, 252 extending about the respective bead core 228, 230 and into the respective lower sidewall regions 246, 248. Further, the radially inner ends 242, 244 of the carcass plies 234, 236 may also extend into respective lower sidewall regions 246, 248. In addition there may be provided a reinforcing structure 260 comprised of one or more layers of parallel cord reinforced tire fabric 262, 264 extending circumferentially about the carcass 232, and substantially coextensive with the tread portion 212. These reinforcing layers 262 and 264 have their cords extending at angles substantially the same as the cord angles as the carcass plies 234 and 236 adjacent thereto. Again, successive carcass plies and reinforcing layers 234, 236, 262 and 264 have alternate bias angles with respect to the mid-circumferential centerline.

A tire according to the present invention is especially useful in conjunction with the belt structure and reinforcing structures described in FIGS. 3 and 4 since the low shear stress in the upper sidewall and tread region of the tire provide a cooler running tire and less susceptibility to separation between such belt structures and reinforcing structures and the carcass plies beneath the tread area.

While the specific embodiments illustrated utilized a crown cord angle $\alpha_o$ of 40° and a $\lambda$ value of 4.3, it will be noted that different values of $\alpha_o$ and $\lambda$ may be utilized. As seen in FIG. 5, the curve J illustrates a tire having a crown cord angle of 50° and a $\lambda$ value of 2.0. Further, the curve L illustrates a tire having a crown cord angle $\alpha_o$ of 60° and a $\lambda$ value of 1.2, which is a practical lower limit for the value of $\lambda$ utilizing a 60° crown cord angle.

It will be noted that various values of the crown cord angle $\alpha_o$ and $\lambda$ are available with the practical limits of $\lambda$ being 1.2 to 10.0 and the practical limits of the crown cord angle $\alpha_o$ being between 40° and 60°. The specific $\lambda$ and $\alpha_o$ values will depend on the tire shape, bead spacing and aspect ratio. It is preferred, however, that in natural shape passenger car tires known in the art today the crown cord angle $\alpha_o$ be between 40° and 50°, and $\lambda$ have a value between 4.3 and 10.0.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a pair of beads, a tread, a pair of sidewalls, and a carcass including a plurality of plies of tire cord fabric, said tire being characterized by the path of the cords in at least one ply of said plies being defined by the equation $\rho \cos^\lambda \alpha = K$ when $\rho$ is the radius from the rotational axis of the tire to a point on the carcass, $\alpha$ is the cord angle of said at least one ply at said point, $\lambda$ is a positive real number between 1.2 and 10, and $K$ is a constant.

2. A tire as claimed in claim 1, further including a belt structure of a tire cord fabric disposed beneath the tread and having a cord angle at the mid-circumferential centerline of the tire which is less than the cord angle of said at least one ply at the mid-circumferential centerline.

3. A tire as claimed in claim 2, further including a reinforcing ply extending about each said bead and into the respectively associated sidewall.

4. A tire as claimed in claim 3, wherein the cord angle of said at least one ply at the mid-circumferential centerline of the tire is between 40° and 60°.

5. A pneumatic tire as claimed in claim 4, wherein the cord angle of said at least one ply at the mid-circumferential centerline is between 40° and 50° and $\lambda$ is between 4.3 and 10.0

6. A pneumatic tire as claimed in claim 1, further including a reinforcing ply extending about each bead and into the respectively associated sidewall.

7. A tire as claimed in claim 6, wherein the cord angle of said at least one ply at the mid-circumferential centerline of said tire is between 40° and 60°.

8. A tire as claimed in claim 7, wherein the cord angle of said at least one ply at the mid-circumferential centerline of the tire is between 40° and 50° and $\lambda$ is between 4.3 and 10.0.

9. A pneumatic tire as claimed in claim 1, wherein the cord angle of said at least one ply at the mid-circumferential centerline is between 40° and 60°.

10. A pneumatic tire as claimed in claim 9, further including at least one reinforcing layer of tire cord fabric disposed beneath said tread and substantially coextensive therewith and having an angle at the mid-circumferential centerline of the tire which is substantially equal to the cord angle of said at least one ply at said mid-circumferential centerline.

11. A pneumatic tire as claimed in claim 1, wherein the cord angle of said at least one ply at the mid-circumferential centerline is between 40° and 50° and $\lambda$ is between 4.3 and 10.0.

12. A pneumatic tire as claimed in claim 11, further including at least one reinforcing layer of tire cord fabric disposed beneath said tread and substantially coextensive therewith and having an angle at the mid-circumferential centerline of the tire substantially equal to the cord angle of said at least one ply at said mid-circumferential centerline.

13. A pneumatic tire as claimed in claim 1, further including at least one reinforcing layer of tire cord fabric disposed beneath said tread and substantially coextensive therewith and having an angle at the mid-circumferential centerline of the tire substantially equal to the cord angle of said at least one ply at said mid-circumferential centerline.

14. A tire as claimed in claim 13, further including a reinforcing ply extending about each bead and into the respectively associated sidewall.

15. A tire as claimed in claim 13, wherein the cord angle of said at least one ply at the mid-circumferential centerline of the tire is between 40° and 50° and $\lambda$ is between 4.3 and 10.0.

16. A tire as claimed in claim 1, in which all of said plies in said carcass have a cord path defined by said equation $\rho \cos^\lambda \alpha = K$.

17. A tire as claimed in claim 2, in which all of said plies in said carcass have a cord path defined by said equation $\rho \cos^\lambda \alpha = K$.

18. A tire as claimed in claim 5, in which all of said plies in said carcass have a cord path defined by said equation $\rho \cos^\lambda \alpha = K$.

19. A tire as claimed in claim 13, in which all of said plies in said carcass have a cord path defined by said equation $\rho \cos^\lambda \alpha = K$.

20. A tire as claimed in claim 15, in which all of said plies in said carcass have a cord path defined by said equation $\rho \cos^\lambda \alpha = K$.

* * * * *